United States Patent
Gerets et al.

(10) Patent No.: US 8,395,636 B2
(45) Date of Patent: Mar. 12, 2013

(54) REDUCING VISIBILITY OF DISPLAY ERRORS

(75) Inventors: Peter Gerets, Roeselare (BE); Bruno Devos, Zulte (BE)

(73) Assignee: Barco N.V., Kortrijk (BE)

( * ) Notice: Subject to any disclaimer, the term of this patent is extended or adjusted under 35 U.S.C. 154(b) by 763 days.

(21) Appl. No.: 12/248,207

(22) Filed: Oct. 9, 2008

(65) Prior Publication Data

US 2009/0096804 A1    Apr. 16, 2009

(30) Foreign Application Priority Data

Oct. 10, 2007   (EP) .................................. 07075876

(51) Int. Cl.
| | | |
|---|---|---|
| G09G 5/00 | (2006.01) | |
| G09G 5/10 | (2006.01) | |
| H04N 5/21 | (2006.01) | |
| H04N 5/57 | (2006.01) | |
| H04N 1/46 | (2006.01) | |
| G06K 9/00 | (2006.01) | |
| G06K 9/40 | (2006.01) | |
| G06T 17/00 | (2006.01) | |
| G03F 3/048 | (2006.01) | |

(52) U.S. Cl. ........ 345/581; 345/428; 345/589; 345/690; 348/630; 348/687; 358/504; 358/516; 358/518; 382/162; 382/167; 382/254; 382/274

(58) Field of Classification Search .................. 345/428, 345/581, 589, 600, 204, 690, 22, 77; 348/177–180, 348/560, 630, 687, 739; 358/504, 509, 516–518; 382/162, 167, 254, 274

See application file for complete search history.

(56) References Cited

U.S. PATENT DOCUMENTS

| | | | |
|---|---|---|---|
| 5,432,893 A * | 7/1995 | Blasubramanian et al. | .. 345/600 |
| 6,040,876 A | 3/2000 | Pettitt et al. | |
| 6,087,003 A * | 7/2000 | Benoit et al. | ................. 428/403 |
| 6,115,092 A | 9/2000 | Greene et al. | |
| 6,243,059 B1 | 6/2001 | Greene et al. | |

(Continued)

FOREIGN PATENT DOCUMENTS

| | | |
|---|---|---|
| JP | 05-300453 A | 11/1993 |
| JP | 06-195048 A | 7/1994 |

(Continued)

OTHER PUBLICATIONS

Examination Report of European Patent Office regarding European Patent Application No. 07 075 876.8, Feb. 4, 2010.

(Continued)

*Primary Examiner* — Wesner Sajous
(74) *Attorney, Agent, or Firm* — Bacon & Thomas, PLLC

(57) ABSTRACT

A method and system are described for adjusting displaying of images to be displayed on a display system. The method is suitable for display systems comprising at least one hardware feature ($f_1$, $f_2$, $f_3$) influencing the display uniformity of the displaying of images, such as e.g. a defect pixel, seams, variations in positions of hardware components, etc. The method comprises obtaining pixelated image information to be displayed on a display system (100), and adjusting the displaying thereof by applying a distributed variation correction signal to the displaying of the pixelated image information. Such a distributed variation correction signal thereby takes into account the at least one hardware feature ($f_1$, $f_2$, $f_3$) of said display system (100) so as to influence the perception of the display uniformity.

2 Claims, 1 Drawing Sheet

U.S. PATENT DOCUMENTS

| | | | |
|---|---|---|---|
| 2003/0007687 A1* | 1/2003 | Nesterov et al. | 382/167 |
| 2003/0011537 A1 | 1/2003 | Dunphy et al. | |
| 2007/0171646 A1* | 7/2007 | Kojima | 362/268 |
| 2007/0291233 A1* | 12/2007 | Culbertson et al. | 353/34 |

FOREIGN PATENT DOCUMENTS

| | | |
|---|---|---|
| JP | 07-261719 A | 10/1995 |
| JP | 2003-509722 A | 3/2003 |
| JP | 2004-062068 A | 2/2004 |
| JP | 2005-031493 A | 2/2005 |
| WO | WO 2007/065244 A1 | 6/2007 |

OTHER PUBLICATIONS

Office Action from Japan Patent Office (JPO) for Japanese Patent application 266846/2008, dated Feb. 21, 2012 (7 pages).

European Search Report dated Mar. 6, 2008—EP 07075876.8.

European Official Communication in corresponding European Application No. 07075876.8 of Sep. 19, 2012.

Japanese Official Communication in corresponding Japanese Application No. 2008-262846 of Sep. 18, 2012.

\* cited by examiner

REDUCING VISIBILITY OF DISPLAY ERRORS

TECHNICAL FIELD OF THE INVENTION

The present invention relates to the field of imaging systems. More particularly, the present invention relates to tiled display systems and methods for displaying images as well as to methods for improving imaging quality.

BACKGROUND OF THE INVENTION

The use of large format display systems is widely spread and finds applications in control rooms, for advertising, for displaying at events, etc. Most large format display systems used are tiled display systems, constructed out of a number of display tiles or display modules. The latter allows to obtain larger display surfaces than obtainable using conventional displays, by placing a plurality of display tiles adjacent to each other and spread the lighting or imaging output over the different display tiles. The display tiles or modules are mechanically coupled together in order to form the full large format display. The space or gap between the different tiles or modules of the display is called a seam.

One of the main specifications of display quality is uniformity in color and brightness. For a tiled display, obtaining color and brightness uniformity is often even more difficult, because the tiles and their seams form a regular structure, which is very easily detected by the human eye. Current displays may have a large bit-depth (16 bits and more) so that they can be very smooth after color/brightness calibration. As a result the tiled display looks very smooth overall. Nevertheless, it is known that if a human eye observes a uniform plane, even the smallest local non-uniformities, such as a small variance on the mechanical seams become visible.

Visibility of seams can occur for a number of reasons. One cause of visibility of the seams is the change in pitch between pixels of neighbouring tiles compared to the pitch between pixels of one tile, which is amongst others determined by the alignment of the display tiles. The seam appears as a dark line if the gap between display tiles increases the pitch between individual light sources (e.g. LED's) or pixels at the edge of neighbouring tiles compared to the pitch between individual light sources or pixels within one tile. The seam appears as a bright line at the crossing between display tiles, if the gap between display tiles decreases the pitch between individual light sources (e.g. LED's) at the edge of neighbouring tiles compared to the pitch between individual light sources or pixels within one tile. In the first case the energetic light flux at the mechanical connection of the display tiles decreases, in the second case the energetic light flux increases. Therefore it is advantageous to keep the pitch between individual light sources constant even over the edges of neighbouring tiles. Another cause of visibility of seams between tiles may be the presence of environmental or stray light, e.g. incident on the backside of the tiled display and guided through the seams in the viewing direction. Mechanical means for hiding the seam are known.

A number of correction techniques are known for correction of visual artifacts in digital images. One example thereof is the use of error diffusion, whereby a error for one pixel is diffused by spreading an error signal or part thereof to neighbouring pixels or to the same pixel in a following frame. Another known method, e.g. as known from U.S. Pat. No. 6,040,876, is the provision of dithering for compensation of image contouring effects caused by quantization errors in digital imaging. The dithering may be especially suitable for reducing false color contouring, by applying the dithering to the chrominance portion of a digital color image signal. The dithering is applied by adding a small amount of noise or pseudo-noise to the image.

SUMMARY OF THE INVENTION

It is an object of the present invention to provide good apparatus or methods for displaying images. It is an advantage of embodiments according to the present invention that methods and systems are provided allowing to optically hide non-uniformities induced by hardware features of the display system, e.g. mechanical features of the display system like variations in optimum position of a pixel or group of pixels. It is an advantage of embodiments according to the present invention that software-based methods and systems can be provided that can be implemented in an efficient way, e.g. without requiring large adjustments to the hardware features of the display system. It is an advantage of embodiments according to the present invention that methods and systems are provided for adjusting the displaying of images that can be easily altered upon variation, e.g. drift or deterioration of optical properties, of the hardware features influencing non-uniformities in the displaying of images by the display system. The above objective is accomplished by a method and device according to the present invention.

The present invention relates to a method for adjusting displaying of image to be displayed on a display system, the method comprising obtaining pixelated image information to be displayed on a display system, the display system comprising at least one hardware feature influencing the display uniformity of the displaying of images, and adjusting the displaying of pixelated image information by applying a distributed brightness and/or color variation correction signal to the displaying of the pixelated image information, said distributed brightness and/or color variation correction signal taking into account said at least one hardware feature of said display system so as to influence the perception of said display uniformity. It is an advantage of embodiments according to the present invention that non-uniformities of the display system can be optically hidden.

The hardware features ($f_1$, $f_2$, $f_3$) may be mechanical features. It is an advantage of embodiments according to the present invention that correction is provided for mechanically induced optical non-uniformities in tiled display. The mechanical features may comprise variations in the expected pixel positions.

The display system may be a tiled display system and may comprise a plurality of display tiles. The method for adjusting the displaying of pixelated image information by applying a variation correction signal may comprise adjusting the displaying of pixelated information by applying a distributed brightness and/or color variation correction signal taking into account a plurality of seams between said display tiles. It is an advantage of embodiments according to the present invention that seams of tiled displays can be optically hidden as this allows a large flexibility for correction. It is an advantage of embodiments according to the present invention that the manufacturing requirements for the display systems can be less stringent.

The at least one hardware feature ($f_1$, $f_2$, $f_3$) may comprise a defect in pixels. It is an advantage of embodiments according to the present invention that the manufacturing requirements for the display systems can be less stringent.

The method furthermore may comprise calibrating the display system and determining the at least one hardware feature ($f_1$, $f_2$, $f_3$) from the calibrating. It is an advantage of embodiments according to the present invention that the hardware features inducing non-uniformities can be taken into account at any moment that calibration is performed.

Applying a distributed brightness and/or color variation correction signal to the displaying of the pixelated display information may comprise applying spatially varying brightness and/or color correction values to the displaying of pixelated display information. It is an advantage of embodiments according to the present invention that the distributed variation may allow errors to be optically hidden while the distributed variations as such are averaged and thus are visually eliminated. It is an advantage that the obtained brightness may correspond with the expected value.

The method may comprise dynamically controlling the distributed variation correction signal.

The method may comprise adjusting the distributed variation correction signal when changes in the at least one hardware feature is detected. The distributed variation may be adapted e.g. when re-calibration is done. It is an advantage of embodiments according to the present invention that the optical correction can be adapted over time, e.g. to adjust to changes in the hardware features, e.g. mechanical features.

The method may comprise varying the distributed variation correction signal between different frames imaged by the display system. It is an advantage of embodiments according to the present invention that any small induced artifact occurring due to the distributed variation may occur only for a small time.

Dynamically controlling the distributed variation correction signal may comprise any of adjusting an amplitude, bandwidth or distribution in time.

The method may comprise applying the distributed variation correction signal to the pixelated display information before splitting of the pixelated display information into pixelated display information for particular tiles.

The method may comprise applying the distributed variation correction signal the plurality of display tiles separately.

The present invention also relates to a method for deriving a correction signal for adjusting displaying of images to be displayed on a display system, the method comprising obtaining information regarding at least one hardware feature of the display system influencing the display uniformity of the displaying of images, and deriving a distributed brightness and/or color variation correction signal taking into account said at least one hardware feature of said display system.

The present invention furthermore relates to an image processor for processing pixelated display information for a display system, the image processor comprising an adjustment means for adjusting the displaying of obtained pixelated image information by applying a distributed brightness and/or color variation correction signal to the displaying of the pixelated image information taking into account at least one hardware feature of the display system influencing the display uniformity of the displaying of images.

The image processor may be adapted for performing a method as set out above.

The present invention furthermore relates to a display system for displaying pixelated image information, the display system comprising an image processor, the image processor comprising an adjustment means for adjusting the displaying of obtained pixelated image information by applying a distributed brightness and/or color variation correction signal to the displaying of the pixelated image information taking into account at least one hardware feature of the display system influencing the display uniformity of the displaying of images.

The display system may be a tiled display system comprising a plurality of display tiles.

The image processor may comprise a plurality of sub-processors, each sub-processor adapted for applying a distributed variation correction signal of pixelated image information for an individual display tile.

The present invention also relates to a computer program product adapted for, when executed on a computer, performing the method of adjusting an image to be displayed as described above or the method of deriving a correction signal as described above.

The present invention furthermore relates to a machine readable data storage device storing such a computer program product or to the transmission thereof over a local or wide area telecommunications network.

It is an advantage of embodiments according to the present invention that a good overall uniformity of a display, e.g. tiled display, can be obtained. According to embodiments of the present invention, the overall uniformity of the display may be improved by providing a deliberate disturbance. It is an advantage of embodiments according to the present invention that small artifacts can be optically hidden.

Particular and preferred aspects of the invention are set out in the accompanying independent and dependent claims. Features from the dependent claims may be combined with features of the independent claims and with features of other dependent claims as appropriate and not merely as explicitly set out in the claims. The teachings of the present invention permit the design of improved methods and apparatus for The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
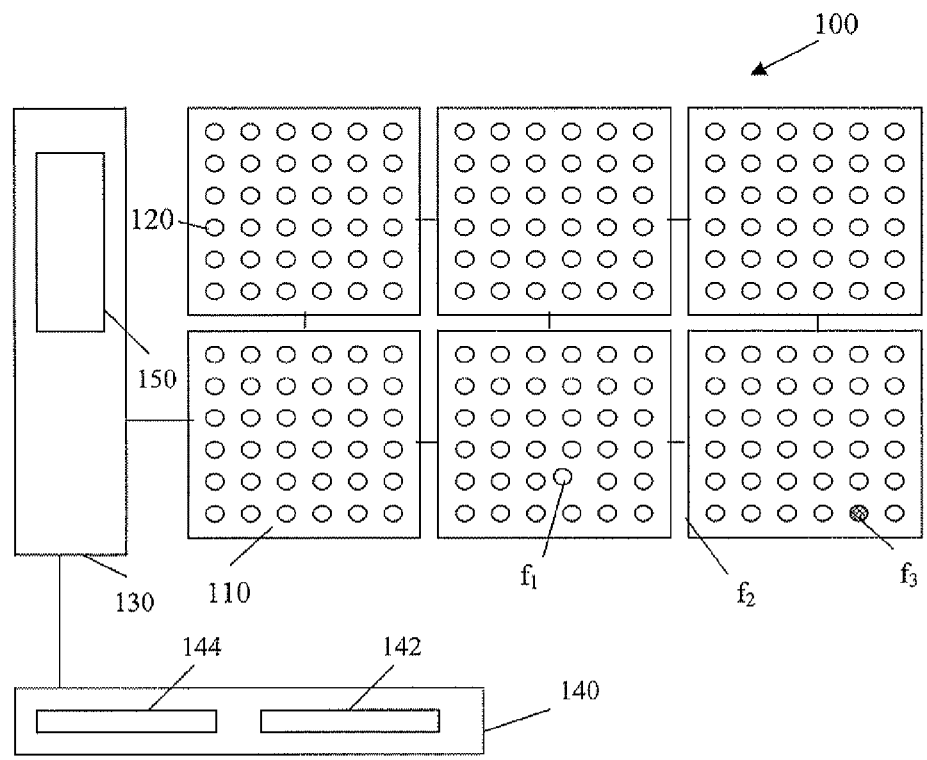
FIG. 1 is a schematic representation of an exemplary display system with a processor for adjusting the displaying of images according to embodiments of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention. Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein. It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention, not necessarily all referring to the same embodiment. Furthermore, the particular features, structures or characteristics may be combined or applied individually in any suitable manner, as would be apparent to one of ordinary skill in the art from this disclosure, in one or more embodiments.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In a first aspect, the present invention relates to a method for adjusting displaying of an image on a display system. The display system may be a display system based on addressable display technologies, such as for example phosphorescent, electroluminescent, organic or inorganic emissive, reflective or other known display technologies. In a particular embodiment, the display system may be a tiled display system whereby an image is generated using a plurality of display tiles, positioned adjacent each other to form a large display panel. The tiled display may e.g. be built up as a matrix of display tiles. The number of display tiles used may dependent on the size of the tiled display required and on the size of the individual display tiles. An array of N×M display tiles may for example be used. In between the display tiles gaps are present, also referred to as seams. The display system alternatively may be a single display panel. The method comprises obtaining pixelated image information to be displayed on the display system. Depending on the source of the image information and the display system used, the pixelated image information may be obtained directly from an external source or may be obtained by processing an input signal to pixelated image information. The pixelated image information may be image information representative of the full tiled display or it may be a combination of pixelated image information for individual display tiles.

According to embodiments of the present invention, the method is adapted for adjusting the displaying of an image on a display system so as to reduce the influencing of the perceived display uniformity by optically hiding. The method thereby is adapted for reducing the influence of hardware features. Such hardware features may be mechanical features, such as for example the occurrence of seams between display tiles, the occurrence of a variation in the pitch between pixels, etc. or other hardware features such as for example the defectivity of a pixel such as for example a LED that has broken down in a LED display. Such mechanical features typically may have a significant impact on the perceived display uniformity.

According to embodiments of the present invention the method further comprises adjusting the displaying of pixelated image information by applying a distributed variation correction signal to the displaying of the pixelated display information. Adjusting the displaying of the pixelated image information may thereby comprise adjusting the pixelated image information such that other pixelated image information is displayed, i.e. adjusting the displaying by processing the pixelated image information. Alternatively or in addition thereto, it may comprise adjusting the display system such that the displaying of pixelated image information is adjusted. The latter may for example be performed by adjusting the light sources, e.g. LEDs, light valves, etc. One embodiment to implement the dither introduction on a hardware level is by using a dedicated processing unit for inducing the dither, whereby modification or control of the dither can be performed by modifying the code of the dedicated processing unit. Alternatively or in addition thereto, part or all of the dither or particular settings for the dither can be introduced on a software level and changes to the software settings may be performed to control or modify the dither. The induced distributed variation correction signal may provide a brightness and/or color variation. It may be a spatially varying correction to the brightness and/or color variation, providing a spatially varying correction signal in brightness and/or color for different pixels. The distributed variation correction signal thereby may be selected such that on average no variation in the brightness or color is achieved. In other words, the corrections are such that these are averaged out by the human eye and thus the variations as such are visually eliminated, resulting in a brightness or color value as expected. Nevertheless, such corrections may assist in optically hiding non-uniformities induced by hardware features of the display system. The latter may be caused by the introduced distribution of the dither or noise whereby the non-uniformity errors generated by the small local artifacts also are averaged out by the human eye. In one embodiment, the distributed variation correction may be considered as noise transposed on the normal brightness levels of the individual display elements for generating the image.

According to embodiments of the present invention the displaying of pixelated image information is adjusted by applying a distributed variation correction signal taking into account the at least one hardware feature of the display system influencing the non-uniformity of the displaying of images.

According to embodiments of the present invention, the distributed variation correction may be a temporally static distributed variation correction. The distributed variation correction may be a temporally dynamic distributed variation correction. The dynamic character may imply a variation in time, e.g. a variation between different frames of the image information to be displayed. The distributed variation correction may be a variation in amplitude or a variation in bandwidth.

The correction signal may be received from an external source or may be calculated, e.g. using predetermined algorithms, neural networks, mathematical methods, etc. The method may comprise generating the distributed variation correction signals according to a predetermined algorithm, whereby the distributed variation depends or is function of the at least one hardware feature influencing the non-uniformity of the displaying of images. In some embodiments, where the adjustment is performed by processing the image data, for pixelated image information OP, the corresponding adjusted pixelated image information AP is obtained by adding to the pixelated image information OP a distributed variation correction signal VC that is dependent on hardware features $f_1$, $f_2$ and $f_3$, i.e.

$$AP=OP+VC(f_1,f_2,f_3)$$

In some embodiments, the method may comprise generating distributed variation correction signals in a processor of the display system. The distributed variation correction signal VC may for example be a random generator for generating from pixel to pixel different values that have a certain distribution. The kind of distribution thereby may be adjusted depending on the hardware features $f_1$, $f_2$ and $f_3$ that initially are visible. If a tiled display system, the method may comprise generating distributed variation correction signals at a central processor common to the different tiles. In this case the distributed variation correction signals are applied before splitting of the pixelated display information into pixelated display information for particular tiles. Alternatively or in addition thereto the method may comprise generating distributed variation signals at distributed processors, each for a different display tile and/or applying the distributed variation correction signals at the distributed processors.

In an optional step, prior to an adjusting, obtaining or generating step, the method may comprise calibrating the display system and determining from the calibration the at least one hardware feature influencing the non-uniformity in the displaying of images. Alternatively the information regarding the at least one hardware feature may be obtained. Such a calibration step may be performed after manufacturing or assembling of the display system. It is an advantage that the calibration can be performed at any time thus allowing to take into account changes of the at least one hardware feature. The one or more features that need to be taken into account thus can be derived. The determination step may be performed in an automated way or may be performed by a user or installer. The determination may comprise obtaining information about the position, size, type of hardware defects.

In a further optional step, the method may comprise providing a feedback of the adjustment. The latter may be performed by detecting an output of a display system and allows adapting the adjustment as function of changes of the at least one hardware feature upon aging, drift etc.

In one embodiment the distributed variation correction signals to be applied may be controlled or adjusted in an iterative process, whereby first distributed variation correction signals are applied, the output of the display system is measured and the distributed variation correction signals are further adapted in view of the measured output. In this way an automatic system for having optimal correction may be obtained. The adjustment of the distributed variation correction signal may for example comprise adjusting the intensity or the correction signal, the spatial and/or frequency distribution thereof etc.

In a second aspect, the present invention relates to a method for deriving a correction signal for adjusting a correction signal for adjusting displaying of images. Such a method comprises obtaining information regarding a at least one hardware feature influencing the non-uniformity in the displaying of images on a display system. The latter may be receiving information from previously performed experiments, by direct input, etc. Obtaining information also may be performed by detecting information regarding the hardware features, such as measuring it with a sensor. The method further comprises deriving from the obtained information a distributed variation correction signal. The signal thus takes into account the at least one hardware feature of the display system. The latter may be performed according to a predetermined algorithm, may be based on a neural network or according to predetermined rules. Alternatively or in addition thereto particular settings of the algorithm or neural network may be set to alter or modify the distributed variation correction signal. The distributed variation correction signal may be adjusted to induce disorder, i.e. to eliminate order such that the hardware defects, and optionally also software defects, are made invisible. It may induce a random distribution. It may induce noise. The noise or random distribution may be added to the image data using the image processor. The distributed variation correction signal may induce variation with a limited amplitude.

In a third aspect, the present invention also relates to an image processor for processing pixelated display information for a display system. Such an image processor comprises an adjustment means for adjusting obtained pixelated image information by applying a distributed variation correction signal to the displaying of the pixelated image information taking into account a at least one hardware feature of the display system influencing the display uniformity of the displaying of images. The processor furthermore may comprise features and components having the functionality of the different method features described in the first aspect. The processor may be a processor common to the different tiles, or it may be a plurality of sub-processors, each processor adapted for processing image information of one or more tiles. The controller may include a computing device, e.g. microprocessor, for instance it may be a micro-controller. In particular, it may include a programmable controller, for instance a programmable digital logic device such as a Programmable Array Logic (PAL), a Programmable Logic Array, a Programmable Gate Array, especially a Field Programmable Gate Array (FPGA). The use of an FPGA allows subsequent programming, e.g. by downloading the required settings of the FPGA.

In a fourth aspect, the present invention further relates to a display system for displaying pixelated information, comprising an adjustment processor as described in the third aspect. The display system may be a display system based on addressable display technologies, such as for example phosphorescent, electroluminescent, organic or inorganic emissive, reflective or other known display technologies. Such a display system may be a tiled display system although it also may be a single display system. The display system may comprise a plurality of tiles, each comprising a plurality of pixels. By way of illustration, the present invention not being limited thereto, an exemplary display system is shown in FIG. 1. The display system 100 shows a number of standard and optional components, such as for example a plurality of display tiles 110. The plurality of display tiles 110 may comprise a plurality of pixels 120. FIG. 1 further indicates a number of hardware features that influence the non-uniformity of the display system, in the present example being a seam between display tiles $f_1$, a variation in position of a display element such as e.g. a pixel $f_2$, a defect display element $f_3$, etc. An adjustment processor 130 as described in the third aspect is also indicated.

The display system 100 furthermore may comprise a feedback system 140 for providing feedback to the controller 130. The feedback system 140 may comprise an optical detector 142, such as e.g. a photodetector like a photodiode, an array photodetector, etc. The optical detector 142 thereby may be adapted to detect the displaying of the image by the display system, e.g. as perceivable by a user. The feedback system 140 may provide a feedback loop between the photodetector 142 and the adjustment processor 130. The feedback system 140 may further comprise a computing unit 144 for deriving from the detected signals information regarding the at least one hardware feature. The computing unit 144 therefore may use a predetermined algorithm, look-up-tables (LUT) or any other suitable means. The computing unit 144 further may be adapted for taking into account a minimum threshold in a perceived image non-uniformity in order to provide a control signal to adjust the induced distributed variation. Such a threshold may be set to a predetermined level. The feedback system 140 may allow automated or automatic adjustment of the displaying of pixelated image information. The display system 100 furthermore comprises, e.g. in the controller, a means 150 for deriving from information of the hardware features, e.g. obtained from the feedback system or obtained during calibration, a correction signal being a distributed brightness and/or color variation to be induced on the pixelated image information. Such a means for deriving may have the functionality for performing the method as described in the second aspect.

Figure 2:
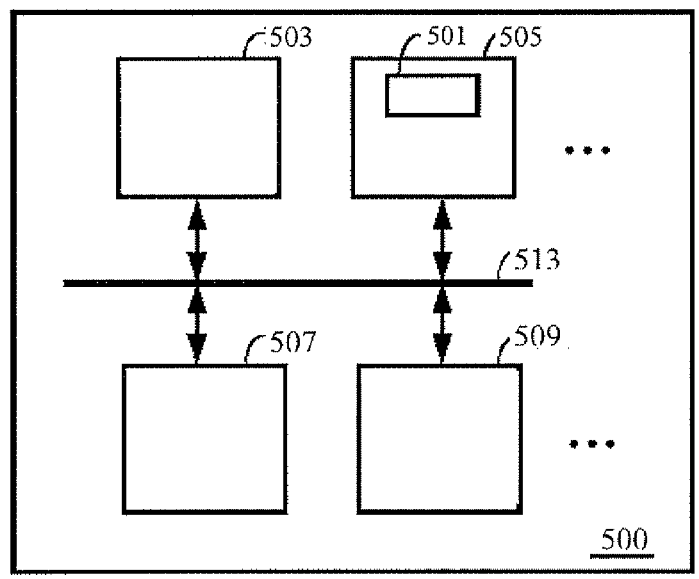
FIG. 2 is a schematic representation of an exemplary computing system as can be used according to embodiments of the present invention.

The above-described method embodiments of the present invention may be implemented in a processing system 500 such as shown in FIG. 2. FIG. 2 shows one configuration of processing system 500 that includes at least one programmable processor 503 coupled to a memory subsystem 505 that includes at least one form of memory, e.g., RAM, ROM, and so forth. It is to be noted that the processor 503 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem 507 that has at least one disk drive and/or CD-ROM drive and/or DVD drive. In some implementations, a display system, a keyboard, and a pointing device may be included as part of a user interface subsystem 509 to provide for a user to manually input information. Ports for inputting and outputting data also may be included. More elements such as network connections, interfaces to various devices, and so forth, may be included, but are not illustrated in FIG. 2. The various elements of the processing system 500 may be coupled in various ways, including via a bus subsystem 513 shown in FIG. 2 for simplicity as a single bus, but will be understood to those in the art to include a system of at least one bus. The memory of the memory subsystem 505 may at some time hold part or all (in either case shown as 511) of a set of instructions that when executed on the processing system 500 implement the steps of the method embodiments described herein. Thus, while a processing system 500 such as shown in FIG. 2 is prior art, a system that includes the instructions to implement aspects of the methods for adjusting the displaying of images is not prior art, and therefore FIG. 2 is not labelled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

It is to be understood that although preferred embodiments, specific constructions and configurations, as well as materials, have been discussed herein for devices according to the present invention, various changes or modifications in form and detail may be made without departing from the scope and spirit of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for adjusting displaying of image to be displayed on a display system, the method comprising:
   obtaining pixelated image information to be displayed on a display system, the display system being a tiled display system comprising a plurality of display tiles, and the display system comprising at least one hardware feature influencing the display uniformity of the displaying of images,
   adjusting the displaying of pixelated image information by applying a correction signal being a distributed variation of brightness and/or color to the pixelated display information taking into account a plurality of seams between said display tiles and taking into account said at least one hardware feature of said display system, and by applying the distributed variation correction signal to the pixelated display information before splitting of the pixelated display information into pixelated display information for particular tiles.

2. A method according to claim 1, wherein the method comprises applying the correction signal to the plurality of display tiles separately.

* * * * *